United States Patent [19]
Alpert

[11] 3,931,942
[45] Jan. 13, 1976

[54] AIR CAR

[76] Inventor: Martin Aaron Alpert, 3207 Meadowbrook Blvd., Apt. 9, Cleveland Heights, Ohio 44118

[22] Filed: June 10, 1974

[21] Appl. No.: 477,788

[52] U.S. Cl............ 244/12 R; 180/117; 244/2; 244/45 R
[51] Int. Cl.² ............ B64C 29/00; B60V 3/08
[58] Field of Search............ 244/12 R, 23 R, 2, 36, 244/43, 45 R, 46, 12 CW; 180/116, 117, 124, 127, 128

[56] References Cited
UNITED STATES PATENTS

| | | | |
|---|---|---|---|
| 1,373,409 | 4/1921 | Caspar | 244/12 R |
| 1,781,910 | 11/1930 | Anker-Holth | 244/12 R |
| 2,681,776 | 6/1954 | Howard | 244/45 A |
| 3,090,581 | 5/1963 | Einarsson | 244/12 R X |
| 3,342,278 | 9/1967 | Cocksedge | 244/12 R X |
| 3,684,216 | 8/1972 | Morgan | 244/36 |
| 3,829,043 | 8/1974 | Benson | 244/12 R |

FOREIGN PATENTS OR APPLICATIONS
936,763  9/1963  United Kingdom ............ 180/116

Primary Examiner—Trygve M. Blix
Assistant Examiner—Barry L. Kelmachter
Attorney, Agent, or Firm—Bosworth, Sessions & McCoy

[57] ABSTRACT

A dual-function aircraft is disclosed having a fuselage shaped like an airfoil, a series of airfoils of shorter chord length arranged in tandem and disposed below the fuselage to provide additional aerodynamic lift, and a downwardly movable rear wall and a pivoted forward airfoil which forms a plenum chamber under the fuselage and produce a cushion of air during the ground mode. Transition from the ground effect mode to the flight mode is made in flight by simultaneously lowering the tandem of airfoils, lifting the rear wall and altering the angle of attack of the forward airfoil.

16 Claims, 13 Drawing Figures

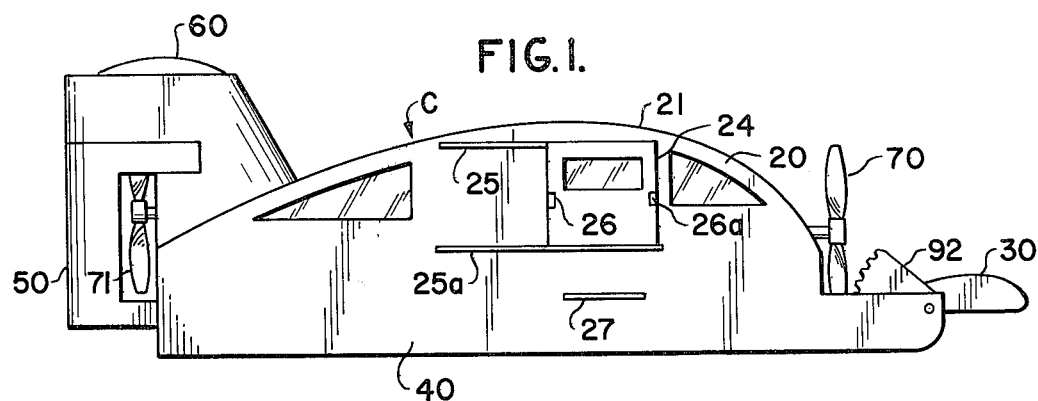
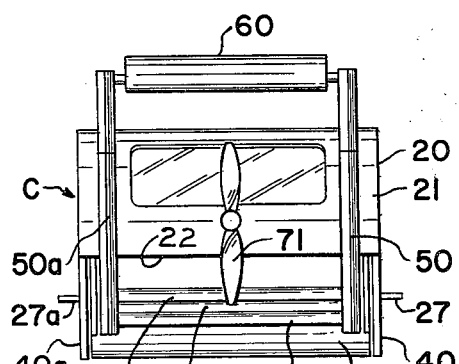
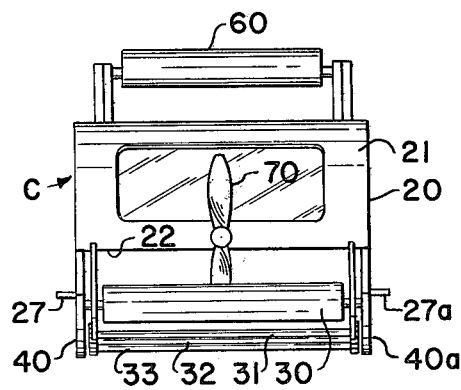
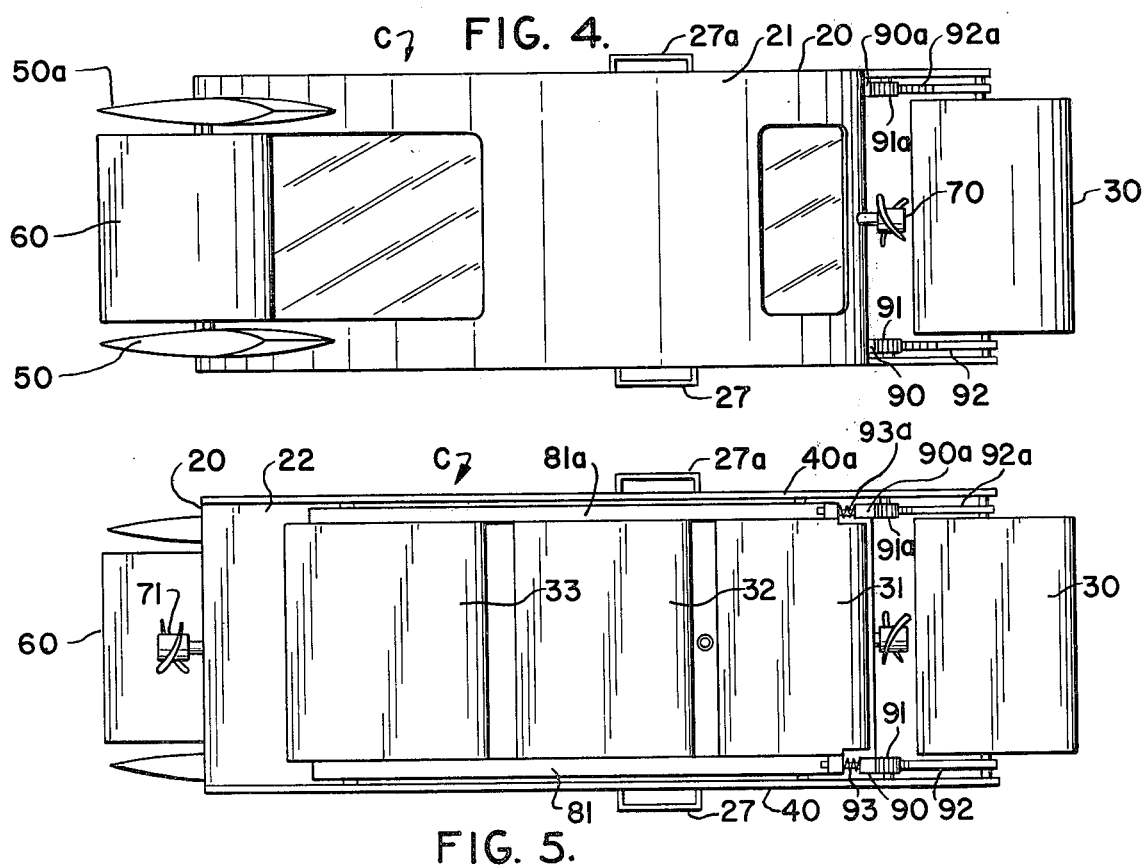

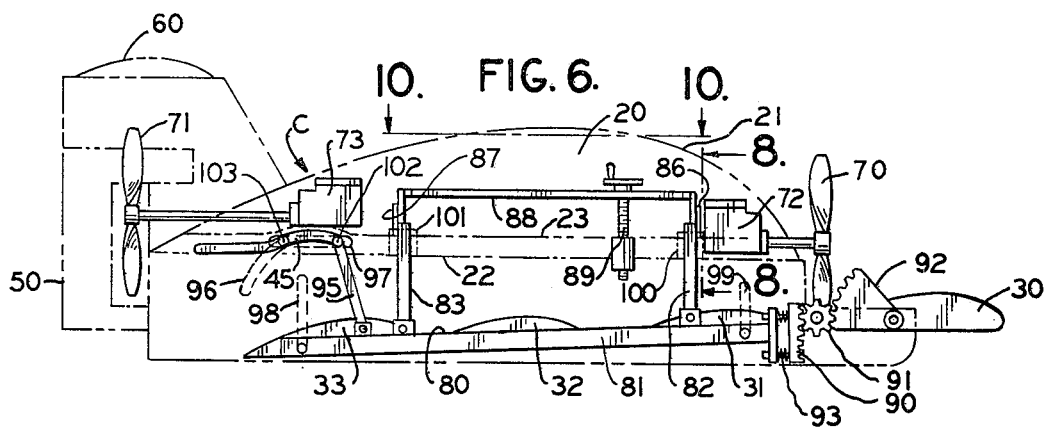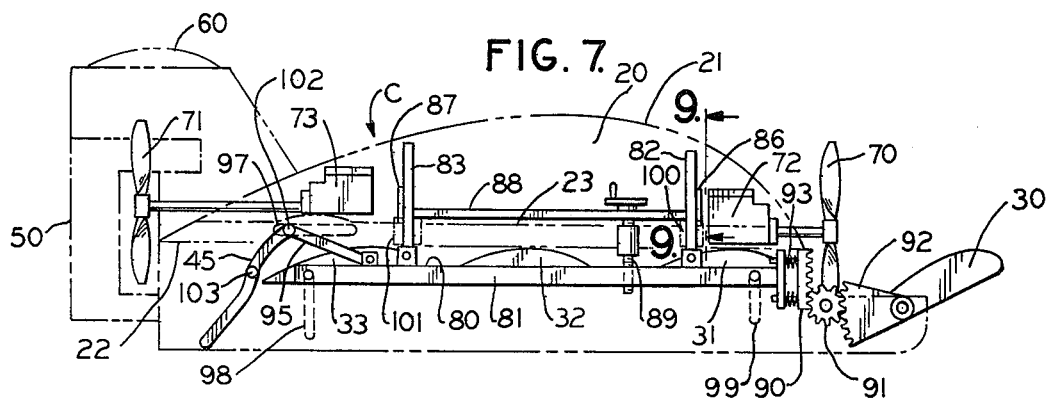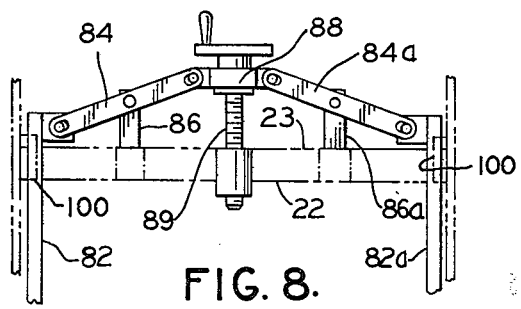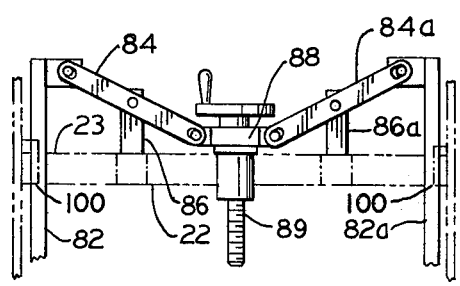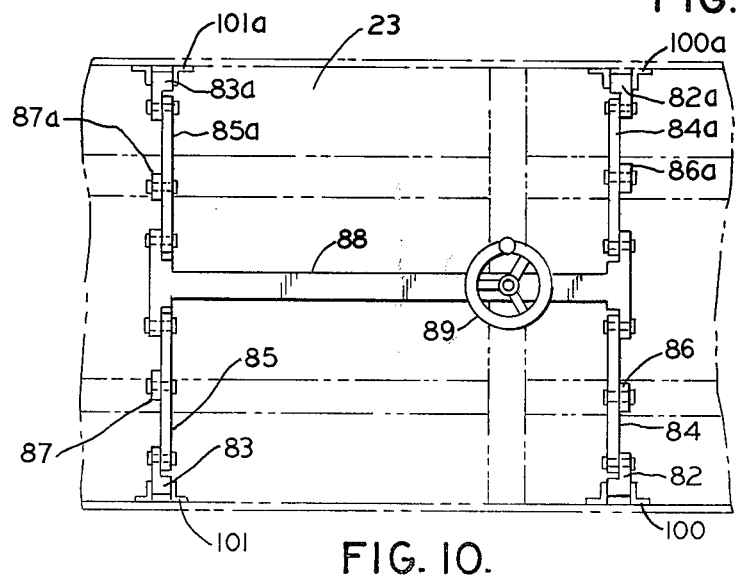

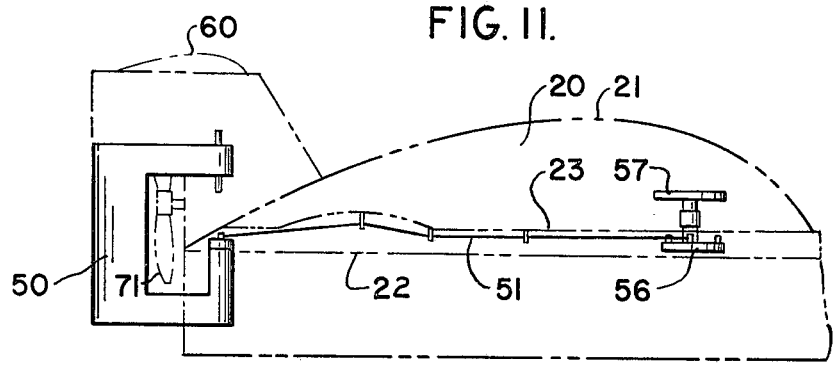
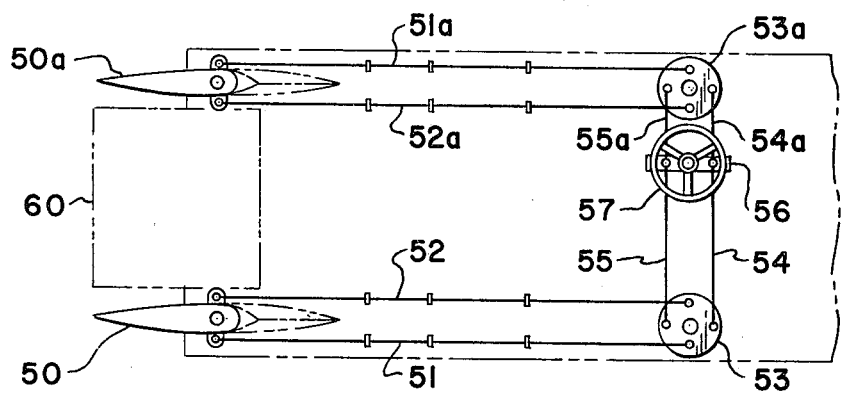
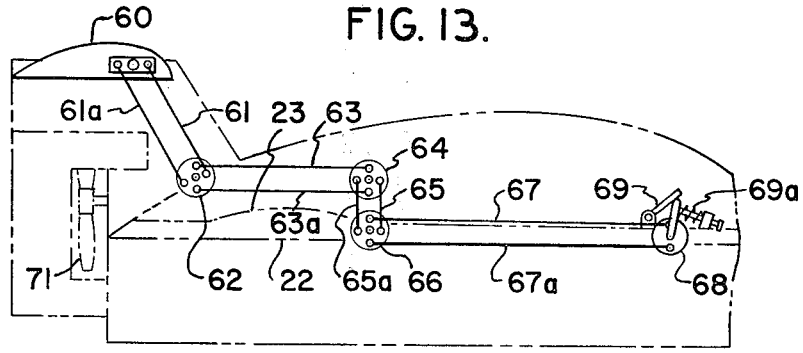

AIR CAR

BACKGROUND OF THE INVENTION

1. Field of the Invention

The field of this invention comprises aircraft and more particularly vertical take-off and land vehicles and ground effect machines.

2. Description of the Prior Art

Vertical take-off and land vehicles vary from helicopters, providing low power economic hovering but slow, inefficient horizontal propulsion, to turbojet lifting engines, providing short duration, inefficient hovering but high speed horizontal propulsion. None of these vehicles offer the combination of low power, economic hovering and economic horizontal propulsion at low speeds in the range of up to about seventy to one hundred miles per hour.

Ground effect machines comprise various classes and designs, the most pertinent of which is the air cushion vehicle. Air cushion vehicles ride on a cushion of compressed air generated and maintained in a space between the vehicle and the ground. The basic design includes a plenum chamber on the bottom that is open towards the ground. In operation, a large volume of air is blown into the chamber and forced against the ground causing the vehicle to lift. The air expanding in the chamber results in a loss in energy with the result being a very inefficient operation. Various methods of increasing efficiency including providing annular jets, nozzles, ducts, ejectors and rubber skirts have been tested but have met with little success. The design parameters of the air cushion vehicles in the prior art are greatly limited. The optimum design is round and the amount of available lift depends on surface area. A commercialized air cushion vehicle of the approximate size of the conventional, family automobile has yet to be widely commercialized. None of these air cushion vehicles are capable of operating at altitudes of more than a couple of feet off the ground, and all of them suffer from a lack of maneuverability and stability making them impractical for commercial use.

SUMMARY OF THE INVENTION

The invention comprises a vehicle having the capability of operating in a ground effect mode at altitudes of only a few inches to about a foot off the ground by developing a cushion of air under it and in a flight mode at altitudes of up to a mile or more by employing an airfoil shaped fuselage that experiences aerodynamic lift as it is moved relative to air and a plurality of airfoils disposed below the fuselage and arranged in tandem to provide additional lift.

A pair of sidewalls depend from the fuselage, extend below its lower surface and together with a rear wall and the forwardmost airfoil form a plenum chamber underneath the fuselage that is open toward the ground. When operating in the ground effect mode, air is blown into the plenum chamber to produce a cushion of air between the fuselage and the ground that lifts the vehicle a few inches to about a foot off the ground. The rear wall and the forwardmost airfoil are slidably and pivotably attached to the vehicle and during the transition from the ground effect mode to the flight mode are moved and rotated to permit air to flow between the fuselage and the airfoils.

The vehicle is propelled and lifted by propeller means positioned at the forward and rearward end of the fuselage. When operating in the ground effect mode the forward propeller means blow air into the plenum chamber to build up and maintain a sufficient pressure therein to lift the vehicle. When operating in the flight mode the forward propeller means blow air over the fuselage and the airfoils to provide the vehicle with aerodynamic lift. In both the ground effect mode and the flight mode, the rearward propeller means provide the vehicle with thrust to enable it to move forward.

The propellers are powered by any conventional means such as one or more internal combustion engines. The size and power rating of the engine or engines depend upon the size and weight of the vehicle.

Horizontal control is effected by rudder means disposed on the rearward end of the vehicle and vertical control is effected by elevator means disposed on said rearward end.

When operating in the ground effect mode the airfoils are positioned adjacent the fuselage so that the gap between the airfoils and the lower surface of the fuselage is at a minimum to facilitate and enhance the formation and operation of the plenum chamber. When operating in the flight mode the airfoils are lowered to increase the gap between the fuselage and the airfoils to permit air to flow between the airfoils and the fuselage to provide the vehicle with the maximum available aerodynamic lift. The movement of the airfoils is effected by any conventional means such as a wheel and gear assembly.

The transition from the ground effect mode to the flight mode is made by simultaneously lowering the airfoils from their position adjacent the fuselage, raising the rearwall and altering the angle of attack of the forwardmost airfoil.

A novel feature of the invention is the combination of the airfoil shaped fuselage with the side walls and the tandem of airfoils disposed below the fuselage.

An object of the invention is to provide a vehicle that is capable of performing efficiently and economically in both the ground effect mode and in the flight mode. Another object of my invention is to provide a vehicle that is simple and economical in construction and at the same time superior to the prior art. Other objects of my invention will become apparent from the description of my preferred embodiment.

BRIEF DESCRIPTION OF THE DRAWINGS

FIG. 1 is a side elevation of an air car embodying the invention.

FIG. 2 is a rearward end elevation of the air car of FIG. 1.

FIGG. 3 is a forward end elevation of the air car of FIG. 1.

FIG. 4 is a top plan view of the air car of FIG. 1.

FIG. 5 is a bottom plan view of the air car of FIG. 1.

FIG. 6 is a side elevation of the air car of FIG. 1 illustrating the airfoils and rear wall in the flight mode position and means for moving the airfoils and rear wall from the flight mode position to the ground effect mode position, with the fuselage, side walls, elevator and rudders shown in phantom.

FIG. 7 is a side elevation of the air car of FIG. 1 illustrating the airfoils and rear wall in the ground effect mode position and means for moving the airfoils and rear wall from the ground effect mode position to the flight mode position with the fuselage, side walls, elevator and rudders shown in phantom.

FIG. 8 is an enlarged partial vertical elevation of the means for moving the airfoils and rear wall from the ground effect mode position to the flight mode position, shown in the ground effect mode position, taken along line 8—8 in FIG. 6.

FIG. 9 is an enlarged partial elevation of the means for moving the airfoils and rear wall from the flight mode position to the ground effect mode position, shown in the ground effect mode position, taken along line 9—9 in FIG. 7.

FIG. 10 is an enlarged partial top plan view of the means for moving the airfoils and rear wall from the flight mode position to the ground effect mode position taken along line 10—10 in FIG. 6.

FIG. 11 is a partial side elevation of the air car of FIG. 1 illustrating means for moving and controlling the rudders with the fuselage, side walls and elevator shown in phantom.

FIG. 12 is a partial top plan view of the air car of FIG. 1 illustrating means for moving and controlling the rudders with the fuselage and elevator shown in phantom.

FIG. 13 is a partial side elevation of the air car of FIG. 1 illustrating means for moving and controlling the elevator with the fuselage, sidewalls and rudders shown in phantom.

DESCRIPTION OF THE PREFERRED EMBODIMENTS

Referring to the drawings, the air car C comprises a vehicle that has the capability of being operated in both the ground effect mode and the flight mode. The term "ground effect mode" is employed to refer to the operation of the vehicle as an air-cushion vehicle flying at altitudes of a few inches to about a foot off the ground. The term "flight mode" refers to the operation of the vehicle as an airplane flying at altitudes of up to a mile or more with aerodynamic lift being provided, in part, by the design of the fuselage 20 and the utilization of the airfoils 30, 31, 32 and 33.

The preferred embodiment of the air car C comprises: the fuselage 20 which is streamlined with an upper surface 21 and a lower surface 22, the surface area of the upper surface 21 being greater than that of the lower surface 22 to enable the fuselage 20 to experience aerodynamic lift as the air car C is moved relative to air; the airfoils 30, 31, 32 and 33 disposed below the fuselage 20, said airfoils being arranged in tandem and having chord lengths that are shorter than that of the fuselage 20, said airfoils providing the air car C with aerodynamic lift as it is operated in the flight mode; the sidewalls 40 and 40a which depend from the fuselage 20 and extend below lower surface 22 and which together with the rearwall 45, the forward airfoil 30, and the lower surface 22, form a plenum chamber under the fuselage that is open toward the ground and is used in producing a cushion of air between the air car C and the ground when the air car is operated in the ground effect mode; the engines 72 and 73 and the propellers 70 and 71 disposed on the forward and rearward end of the air car C for propelling and lifting the vehicle; and the rudders 50 and 50a and the elevator 60 disposed on the rearward end of the air car C for steering the vehicle.

The fuselage 20 is constructed of sheet metal, aluminum, fiberglass, plastic covered wood or any other material having similar qualities and characteristics of strength, durability and light weight. It is made substantially air tight to permit flight at altitudes of a mile or more and to prevent the in-leakage of high pressured air from the plenum chamber during ground effect mode operation. It houses the passenger compartment, the engines 72 and 73 and the controls for operating the airfoils, rudders and elevator. The space between floor 23 and lower surface 22 houses the rear wall 45 when the vehicle is operated in the flight mode, as illustrated in FIG. 6, and the mechanisms for operating the rudders 50 and 50a and the elevator 60, as illustrated in FIGS. 11 to 13. Door 24 opens and closes by sliding on guide rails 25 and 25a and has latches 26 and 26a on each side. Steps 27 and 27a on the outside of sidewalls 40 and 40a, respectively, facilitate entering the vehicle.

The preferred embodiment of the fuselage 20 includes the flat lower surface 22. In an alternate embodiment of the air car C, not shown, the lower surface 22 is streamlined and curved outwardly from the upper surface 21 of the fuselage 20 as viewed from a cross-sectional, side elevation of the vehicle, and has a surface area that is less than the surface area of the upper surface 21.

The airfoil 30 is pivotally attached to and disposed between the sidewalls 40 and 40a. Its angle of attack is adjusted to provide the air car C with aerodynamic lift when the vehicle is operated in the flight mode, as illustrated in FIGS. 1 to 6, and to form the partially open, forward end wall of the plenum chamber when the vehicle is operated in the ground effect mode, as illustrated in FIG. 7. It is constructed of either the same material as the fuselage 20 or any other material having similar qualities and characteristics of strength, durability and light weight. In an alternative embodiment of my air car C, not shown, airfoil 30 is not utilized and the air pressure in the plenum chamber during ground effect mode operation is maintained by the back pressure induced by the movement of propeller 70. Alternatively, the airfoil 30 can have a curved lower surface to improve its aerodynamic performance.

The airfoils 31, 32 and 33 are disposed beneath the fuselage 20 and attached to and disposed between the horizontal support members 81 and 81a of the airfoil support frame 80. They are constructed of substantially the same material as airfoil 30 so as to have similar qualities and characteristics of strength, durability and light weight. When operating in the ground effect mode, the airfoils 31, 32 and 33 are positioned adjacent the lower surface 22 of the fuselage 20, as illustrated in FIG. 7, so that the gap between the airfoils and the lower surface 22 is at a minimum to facilitate and enhance the formation and operation of the plenum chamber. When operating in the flight mode the gap between the airfoils and the lower surface 22 is increased, as illustrated in FIG. 6, to permit air to flow between the airfoils and the fuselage to provide the vehicle with the maximum available aerodynamic lift. When operating in the flight mode the angle of attack of the airfoils 31, 32 and 33 is up to about 10 or 12° more than the angle of attack of the fuselage 20, as illustrated in FIG. 6, to provide the vehicle with additional aerodynamic lift. The lower surfaces of the airfoils can be curved to improve aerodynamic performance.

An alternate embodiment of the airfoils 31, 32 and 33, not shown, is a semi-circular, cross-sectional design as viewed from the forward end of the vehicle. This alternate embodiment provides additional aerodynamic lifting surface area which decreases the amount of power and horizontal speed required to make the transition from the ground effect mode to the flight mode. In this alternate embodiment air foil 30 can have either the rectangular, cross-sectional design, as illustrated in FIG. 3, or a semi-circular, cross-sectional design that is the same as, or similar to, the design of the airfoils 31, 32 and 33.

Another alternate embodiment of the airfoils 31, 32 and 33, not shown, is a dual, semi-circular, cross-sectional design as viewed from the forward end of the vehicle. This alternate embodiment also provides additional aerodynamic lifting surface and includes two engines and propellers on both the forward and the rearward end of the vehicle to provide a free flowing stream of air over each semi-circular half of the airfoils. In this alternate embodiment airfoil 30 can have either the rectangular, cross-sectional design, as illustrated in FIG. 3, or a dual, semi-circular, cross-sectional design that is the same as, or similar to, the design of the airfoils 31, 32 and 33.

Rear wall 45 is disposed between and slidably attached to guide rails 96, 97, 96a and 97a, the latter two not shown but being oppositely disposed from the former two, and forms a part of the plenum chamber during ground effect mode operation, as illustrated in FIG. 7. When the vehicle is operated in the flight mode the rear wall 45 is withdrawn into the space between the floor 23 and the lower surface 22 of the fuselage 20, as illustrated in FIG. 6 to permit the flow-through of air between the fuselage 20 and the airfoils 30, 31, 32 and 33 from the forward to the rearward end of the vehicle. Rear wall 45 is constructed of substantially the same material as the fuselage 20 and/or the airfoils 30, 31, 32 and 33 so as to have similar qualities and characteristics of strength, durability and light weight. When viewed from the side, as illustrated in FIGS. 6 and 7, rear wall 45 has a slight curvature in its upper half to facilitate its movement around airfoil 33 and into and out of the space between floor 23 and lower surface 22 of fuselage 20.

The airfoils 30, 31, 32 and 33 and the rear wall 45 are moved from the flight mode position, illustrated in FIG. 6, to the ground effect mode position, illustrated in FIG. 7, and vice versa, by the movement of the airfoil support frame 80.

Referring to FIGS. 6 to 10, the airfoil support frame 80 comprises the horizontal airfoil support members 81 and 81a which are pivotally attached to and suspended from the vertical support members 82, 82a, 83 and 83a. The lever arms 84, 84a, 85 and 85a pivot about the fulcrum members 86, 86a, 87 and 87a, respectively, and are pivotally attached at one end to the tops of the vertical support members 82, 82a, 83 and 83a, respectively, and at the other end to the center bar 88 which is attached to and mounted on the screw mechanism 89. The fulcrum members 87 and 87a are disposed slightly closer to the center of the vehicle than are the fulcrum members 86 and 86a, as illustrated in FIG. 10, to enable the vertical support members 83 and 83a to drop further than the vertical members 82 and 82a to impart the frame 80 with a slightly angular position in the flight mode as illustrated in FIG. 6. The vertical support members 82, 82a, 83 and 83a are partially disposed in and slide up and down in guide rails 100, 100a, 101 and 101a, respectively, which impart stability to the frame 80. Rollers on the sides of the horizontal members 81 and 81a move in guide rails 98, 99, 98a and 99a, the latter two not shown, disposed in the side walls 40 and 40a to impart further stability to the movements of the frame 80. The rack gears 90 and 90a are adjustably attached to the forward ends of the horizontal support members 81 and 81a, respectively, by the bolt and compression spring assemblies 93 and 93a, respectively, and engage the pinion gears 91 and 91a, respectively. Bolt and spring assemblies 93 and 93a permit racks 90 and 90a and pinions 91 and 91a to compensate for the slightly angular downward movement of the horizontal members 81 and 81a. Partial pinion gears 92 and 92a are attached to airfoil 30 and engage pinions 91 and 91a, respectively. Rear wall 45 is slidably attached to, and disposed between guide rail 96 in sidewall 40, guide rail 97 in the side of fuselage 20 and guide rails 96a and 97a, not shown, in sidewall 40a and the other side of fuselage 20, respectively. Urging rods 95 and 95a, the latter not shown, are pivotally attached at one end to the rearwall 45 and at the other end to the horizontal support members 81 and 81a, respectively.

Movement of the airfoils 30, 31, 32 and 33 and the rearwall 45 from the ground effect mode position, illustrated in FIG. 7, to the flight mode position, illustrated in FIG. 6, is initiated and controlled by turning screw mechanism 89. Turning the screw mechanism raises the center bar 88 from the position illustrated in FIGS. 7 and 9 to the position illustrated in FIGS. 6 and 8. Raising the center bar induces the lever arms 84, 84a, 85 and 85a to pivot about the fulcrum members 86, 86a, 87 and 87a and the vertical support members 82, 82a, 83 and 83a to descend from the positions illustrated in FIGS. 7 and 9 to the positions illustrated in FIGS. 6 and 8. The downward movement of the vertical support members causes the horizontal support members 81 and 81a and the airfoils 31, 32 and 33 to descend from the positions illustrated in FIG. 7 to the positions illustrated in FIG. 6. Movement of the horizontal support members causes the rack gears 90 and 90a to descend from the position illustrated in FIG. 7 to that illustrated in FIG. 6. The movement of the rack gears induces pinions 91 and 91a to rotate which induces the rotation of the partial pinions 92 and 92a and the airfoil 30 from the positions illustrated in FIG. 7 to the positions illustrated in FIG. 6. The downward movement of the horizontal support members also causes the urging rods 95 and 95a to move forward and downward from the position illustrated in FIG. 7 to the position illustrated in FIG. 6. Movement of the urging rods causes the rollers 102 and 102a, the latter not being shown, to move forward in guide rail 97 and the rollers 103 and 103a, the latter not being shown, to move upward and forward in guide rail 96 with the result being the movement of the rearwall 45 from the position illustrated in FIG. 7 to the position illustrated in FIG. 6. Movement of the airfoils 30, 31, 32 and 33 and the rearwall 45 from the flight mode position illustrated in FIG. 6 back to the ground effect mode position illustrated in FIG. 7 is initiated and controlled by turning the screw mechanism 89 in the direction opposite from above with the result being a reversal of the foregoing movements and functions.

The vehicle is lifted and propelled by the propellers 70 and 71 which are driven by the engines 72 and 73, respectively. When operating in the ground effect mode the rotation of propeller 70 causes air to be blown into the plenum chamber at a sufficient rate to build up and maintain enough pressure therein to lift the vehicle. The amount of pressure needed to lift the vehicle is dependent upon its weight and load. When operating in the flight mode the rotation of the forward propeller 70 causes air to be blown over the fuselage 20 and the airfoils 31, 32 and 33 at a sufficient rate to aerodynamically lift the vehicle and provide it with thrust to enable it to move forward. Suction from the rotation of the forward propeller 70 causes air to be blown over the airfoil 30 to provide the vehicle with additional aerodynamic lift when operating in the flight mode. When operating in both the ground effect mode and the flight mode the rotation of the rearward propeller 71 provides the vehicle with thrust to enable it to move forward. When operating in the flight mode the rotation of the rearward propeller also imparts a suction effect to the air passing over the fuselage 20 and the airfoils 30, 31, 32 and 33 and thereby adds to the amount of available aerodynamic lift.

Engines 72 and 73 are conventional internal combustion engines, the size and power rating of which is dependent upon the size and weight of the vehicle and the desired power and available speed. For a vehicle that is the approximate size of a conventional automobile weighing from about 500 to 1000 pounds and capable of air speeds from about 70 to 100 miles per hour, while operating in the flight mode, 50 to 100 horsepower is sufficient for each of the two engines. The throttles, not shown, are controlled by a hand lever means and during operation in both the ground effect mode and the flight mode are generally operated at a cruise setting.

Horizontal control of the vehicle is effected by the movement and control of the rudders 50 and 50a. Referring to FIGS. 11 and 12, cables 51 and 52, and 51a and 52a are disposed between and attached to rudders 50 and 50a, and wheels 53 and 53a, respectively. Center bar 56 which is connected to and moved by steering wheel 57 is disposed between and attached to wheels 53 and 53a by cables 54 and 55, and 54a and 55a, respectively. Clockwise movement in the steering wheel creates tension in cables 55 and 54a and causes wheels 53 and 53a to turn clockwise. The turning of the wheels 53 and 53a creates tension in cables 52 and 51a, respectively, which causes the rudders 50 and 50a and the vehicle to turn to the left. In the same manner, counterclockwise movement of the steering wheel 57 causes the rudders 50 and 50a and the vehicle to turn to the right.

Vertical control of the vehicle is effected by the movement and control of the elevator 60. The lower surface of elevator can be curved to improve its aerodynamic performance. Referring to FIG. 13, foot pedal 69 is pivotally mounted to press against spring loaded pedal mechanism 69a which is attached to wheel 68. Cables 67 and 67a are disposed between and attached to wheels 68 and 66. Cables 65 and 65a are disposed between and attached to wheels 66 and 64. Cables 63 and 63a are disposed between and attached to wheels 64 and 62. Cables 61 and 61a are disposed between and attached to the elevator 60 and wheel 62. In operation, foot pedal 69 is pressed against the spring loaded pedal mechanism 69a which causes the wheel 68 to turn clockwise. The turning of wheel 68 creates tension in cable 67 which causes wheel 66 to turn clockwise. The turning of wheel 66 creates tension in cable 65 which causes wheel 64 to turn clockwise. The turning of wheel 64 creates tension in cable 63 which causes wheel 62 to turn clockwise. The turning of wheel 62 creates tension in cable 61 which causes the elevator 60 to turn clockwise which causes the forward end of the vehicle to rise. In the same manner, releasing the foot pedal 69 permits the spring loaded pedal mechanism 69a to rotate the elevator counterclockwise which causes the forward end of the vehicle to drop. Level flight is maintained by keeping the foot pedal 69 partially depressed.

In operation, the air car first becomes airborne by operating as an air cushion vehicle in the ground effect mode. When an air speed of between 30 and 50 miles per hour is attained the transition to the flight mode can be made by simultaneously lowering the airfoils 31, 32 and 33, raising the rearwall 45 and altering the angle of attack of the airfoil 30 from the positions illustrated in FIG. 7 to the positions illustrated in FIG. 6 by turning the screw mechanism 89. To insure stability during the transition it is best to do it slowly taking for example about 30 seconds to complete the transition. When operating in the flight mode horizontal speeds of about 70 to 100 miles per hour and altitudes of about a mile can be attained for a vehicle the approximate size of a conventional automobile having two to four passengers. The air car is landed by decreasing the air speed to about 30 to 50 miles per hour, decreasing the altitude to about a foot off the ground, making the transition back to the ground effect mode by simultaneously raising the airfoils 31, 32 and 33, lowering the rearwall 45 and altering the angle of attack of the airfoil 30 by turning the screw mechanism 89, and then further decreasing the airspeed and decreasing the pressure in the plenum chamber by decreasing the rotation rate of the propellers 70 and 71 until the vehicle touches down.

While I have illustrated and disclosed a preferred, and alternate forms and embodiments of my invention, other forms, as well as changes and improvements therein and thereon will occur to those skilled in the art who come to know and understand my invention, all without departing from the essence and substance thereof. Therefore, I do not want my patent to be restricted merely to that which is specifically disclosed herein, nor in any manner inconsistent with the progress by which my invention has promoted the progress of the art.

I claim:

1. A vehicle capable of flight as an aircraft in the flight mode and movement along the ground in the ground effect mode comprising:

a streamlined fuselage shaped like an airfoil and having a curved convex upper surface and a lower surface extending in the same lateral direction, said upper surface having a greater surface area than said lower surface to enable said fuselage to provide aerodynamic lift when moved relative to air, a plurality of horizontal airfoils of smaller size disposed under said fuselage, said airfoils being arranged in tandem and having chord lengths that are shorter than the chord length of said fuselage, said smaller airfoils extending laterally in a direction substantially parallel to the upper and lower surfaces of said fuselage and being adapted in the flight mode to provide the vehicle with additional aerodynamic lift, said fuselage having means including a pair of sidewalls depending from said fuselage and extending below said lower surface near the terminal ends of said smaller airfoils to form a plenum chamber for trapping a cushion of compressed air between the vehicle and the ground to provide the vehicle with supporting lift when operating in the ground effect mode which is insufficient to cause flight so that the suspended vehicle remains close to the ground, propelling means for causing air to move rearwardly over said fuselage and said airfoils to move the vehicle in excess of flight speed during the flight mode and for blowing air into said plenum chamber to create a pressure therein sufficient to lift the vehicle during the ground effect mode, said fuselage and said smaller airfoils when operating in the flight mode providing means for imparting maximum lift to the vehicle to enable it to take off and maneuver as an aircraft at substantial altitudes remote from the ground, means for causing relative vertical movement between portions of said fuselage and said airfoils to modify the rate of flow of air over said airfoils and the amount of lift provided by the airfoils to enable the vehicle to function in both of said flight and ground modes, rudder and elevator means for steering and controlling said vehicle during the flight mode, the airfoils being positioned adjacent the fuselage during operation in the ground effect mode, and means for lowering said airfoils to increase the space between the airfoils and the fuselage for operation in the flight mode.

2. The vehicle of claim 1 with a pivotally attached airfoil on the forward end of the vehicle, the angle of attack of said airfoil being adjustable to provide the vehicle with aerodynamic lift when operating in the flight mode and a partially open forward end wall for the plenum chamber when operating in the ground effect mode.

3. A vehicle of the character described capable of flight as an aircraft in the flight mode and movement along the ground in the ground effect mode comprising:

a fuselage, said fuselage being streamlined and having a curved convex upper surface and a lower surface, said upper surface having a greater surface area than said lower surface and being shaped to enable said fuselage to experience aerodynamic lift when moved relative to air, a plurality of laterally extending airfoils of smaller size disposed under said fuselage, said smaller airfoils being arranged in tandem and having chord lengths that are shorter than the chord length of said fuselage, said airfoils being adapted to provide said vehicle with aerodynamic lift as it is moved relative to air, said fuselage and said airfoils providing means for lifting the vehicle off the ground in the flight mode, whereby the vehicle functions as an aircraft at substantial altitudes, means including a pair of sidewalls depending from said fuselage and extending below said lower surface near the terminal end of said smaller airfoils for trapping a cushion of compressed air between the vehicle and the ground to provide said vehicle with lift when operating in the ground effect mode, means for lowering said airfoils to increase the gap between the airfoils and the lower surface of the fuselage for operation in the flight mode, propelling means for displacing air to propel said vehicle in excess of flight speed during the flight mode, and airfoil means for steering said vehicle.

4. The vehicle of claim 3 wherein said air cushion means forms a plenum chamber under the fuselage to receive air from said propelling means during operation in the ground effect mode.

5. The vehicle of claim 4 wherein the airfoils are positioned adjacent the lower surface of the fuselage during operation in the ground effect mode.

6. The vehicle of claim 4 wherein said plenum chamber includes a rear wall mounted for movement from an upper retracted position to a lower advanced position near the ground.

7. The vehicle of claim 6 wherein said rear wall extends between said side walls and is mounted to swing down from a generally horizontal retracted position.

8. The vehicle of claim 3 wherein a pivotally attached airfoil is disposed on the forward end of the vehicle.

9. The vehicle of claim 8 wherein said pivotally attached airfoil has a normal position during the flight mode wherein it imparts lift to the vehicle and has an inclined advanced position during the ground mode wherein it extends between the sidewalls to form the front wall of a plenum chamber below said fuselage.

10. The vehicle of claim 3 wherein said propelling means is driven by a combustion engine and blows air into a plenum chamber formed under the fuselage by said air cushion means to cause movement of the vehicle along the ground.

11. A process of operating a vehicle having a fuselage shaped like an airfoil, airfoil means for steering the vehicle, and a power plant for imparting forward thrust to the vehicle, said fuselage being streamlined and having a curved convex upper surface with greater surface area than its lower surface to enable the fuselage to provide aerodynamic lift, said process comprising the steps of providing a plurality of horizontally spaced spaced airfoils of smaller size having chord lengths that are shorter than the chord length of said fuselage, said airfoils extending laterally and being of a size and shape to provide said vehicle with aerodynamic lift as it is moved relative to air, positioning said airfoils in tandem and away from said fuselage to cause them to impart maximum lift to the vehicle and to enable the vehicle to maneuver as an aircraft in a flight mode at substantial altitude remote from the ground, thereafter causing said airfoils to move bodily in a vertical direction relative to said fuselage to reduce the lift imparted to the vehicle while providing a plenum chamber below said fuselage and blowing air into said plenum chamber to provide a cushion of compressed air under the fuselage, whereby said vehicle travels proximate to the ground in a ground mode with insufficient lift for flight.

12. The process of claim 11 in which an additional airfoil is provided forward of the fuselage and moved from a position, wherein it imparts aerodynamic lift during the flight mode, to an inclined position during the ground mode, wherein it deflects air into said plenum chamber, and in which conversion from the ground mode to the flight mode is effected by lifting a rear wall portion of said fuselage, altering the angle of attack of said forward airfoil, and lowering the tandem of airfoils below said fuselage.

13. The process of claim 11 in which an additional airfoil is provided forward of the fuselage and is moved from a position wherein it directs air toward said airfoils during the flight mode to an inclined position during the ground mode, wherein it deflects air downwardly into said plenum chamber while restricting flow out of the front end of said chamber.

14. A vehicle capable of flight as an aircraft in the flight mode and movement along the ground in the ground effect mode comprising:
- a streamlined fuselage shaped like an airfoil and having a curved convex upper surface and a lower surface extending in the same lateral direction, said upper surface having a greater surface area than said lower surface to enable said fuselage to provide aerodynamic lift when moved relative to air,
- a plurality of horizontal airfoils of smaller size disposed directly underneath said fuselage, said airfoils being arranged in tandem and having chord lengths that are shorter than the chord length of said fuselage, said smaller airfoils extending laterally in a direction substantially parallel to the upper and lower surfaces of said fuselage and being adapted in the flight mode to provide the vehicle with additional aerodynamic lift,
- said fuselage having means including a pair of sidewalls depending from said fuselage and extending below said lower surface near and outwardly of the terminal ends of said smaller airfoils to form a plenum chamber for trapping a cushion of compressed air between the vehicle and the ground to provide the vehicle with supporting lift when operating in the ground effect mode which is sufficient to support the vehicle but is insufficient to cause flight so that the suspended vehicle remains close to the ground, said fuselage extending the length of said plenum chamber to close the top thereof,
- propelling means for causing air to move rearwardly over said fuselage and said airfoils to move the vehicle in excess of flight speed during the flight mode and for blowing air into said plenum chamber to create a pressure therein sufficient to lift the vehicle during the ground effect mode,
- said fuselage and said smaller airfoils when operating in the flight mode providing means for imparting maximum lift to the vehicle to enable it to take off and maneuver as an aircraft at substantial altitudes remote from the ground,
- means for raising and lowering said airfoils to modify the rate of flow of air over said airfoils and the amount of lift provided by the airfoils to enable the vehicle to function in both of said flight and ground modes, and
- rudder and elevator means for steering and controlling said vehicle during the flight mode.

15. The vehicle of claim 14 with a pivotally attached airfoil disposed on the forward end of the vehicle.

16. A vehicle capable of flight as an aircraft in the flight mode and movement along the ground in the ground effect mode comprising:
- a fuselage shaped like an airfoil, said fuselage being streamlined and having a curved convex upper surface and a lower surface which extends in a lateral direction parallel to said upper surface, said upper surface having a greater surface area than said lower surface and being shaped to enable said fuselage to provide aerodynamic lift when moved relative to air,
- a plurality of separate horizontally spaced airfoils of smaller size carried by said fuselage and extending laterally in a direction substantially parallel to the lower surface of said fuselage, said smaller airfoils being arranged in tandem in a single row and having chord lengths that are shorter than the chord length of said fuselage, said airfoils being adapted to provide said vehicle with aerodynamic lift as it is moved relative to air,
- said fuselage and said airfoils when operating in the flight mode providing means for imparting maximum lift to the vehicle to enable it to maneuver as an aircraft at substantial altitudes remote from the ground,
- means for moving said smaller airfoils and for positioning them away from said fuselage to provide maximum lift during operation in the flight mode,
- means including a pair of sidewalls depending from said fuselage outwardly of said smaller airfoils and extending below said lower surface for trapping a cushion of compressed air between the vehicle and the ground to provide said vehicle with lift and to support the entire weight of the vehicle when operating in the ground effect mode, said air cushion means forming a plenum chamber under the fuselage and under said airfoils,
- a rear wall mounted on said fuselage for movement from an upper retracted position during the flight mode to a lower advanced position during the ground effect mode, wherein said rear wall closes the rear of said plenum chamber,
- propelling means at the front of said vehicle for blowing air rearwardly over said fuselage and said airfoils to move said vehicle in excess of flight speed during the flight mode and for blowing air into said plenum chamber to maintain a pressure therein sufficient to lift the vehicle during the ground effect mode, and
- airfoil means for steering said vehicle during the flight mode.

* * * * *